United States Patent [19]
Kim et al.

[11] Patent Number: 5,748,187
[45] Date of Patent: May 5, 1998

[54] SYNCHRONIZATION CONTROL OF MULTIMEDIA OBJECTS IN AN MHEG ENGINE

[75] Inventors: Jin-Suk Kim; Sung-Been Cho; Hae-Won Lee; Byeong-Won Jin; Sung-Yul Park, all of Daejeon, Rep. of Korea

[73] Assignees: Electronics and Telecommunications Research Institute, Daejeon-shi; Korea Telecommunication Authority, Seoul, both of Rep. of Korea

[21] Appl. No.: 562,190

[22] Filed: Nov. 22, 1995

[30] Foreign Application Priority Data

Dec. 13, 1994 [KR] Rep. of Korea ............... 94-33908

[51] Int. Cl.$^6$ ..................................................... G06F 17/00
[52] U.S. Cl. ............................................ 345/302; 395/762
[58] Field of Search ............................... 395/806, 807, 395/762; 345/302

[56] References Cited

U.S. PATENT DOCUMENTS 5,515,490  5/1996  Buchanan et al. ............... 395/806
5,594,911  1/1997  Cruz et al. ...................... 395/806

OTHER PUBLICATIONS

Bertrand et al., "The MHEG Standard and its Relation with the Multimedia and Hypermedia Area", *Intl. Conf. on Image Processing and its Applications*, pp. 123–126, Apr. 1992.

Colaïtis et al., "MHEG: An Emerging standard for the Interchange of Multimedia and Hypermedia Objects", *IEEE Intl. Conf. on Comm. '93 (ICC '93)*, v. 1, pp. 542–546, May 1993.

Markey, "HyTime and MHEG", 37th IEEE Computer Society Intl. Conf. (COMPCON Spring 1992), pp. 25–40, Feb. 1992.

Meyer–Boudnik et al., "MHEG Explained", *IEEE Multimedia*, v. 2, n. 1, pp. 26–38, Spring 1995.

Little, et al.: "Synchronization and Storage Models for Multimedia Objects"; pp. 413–427; IEEE Journal on Selected Areas in Comm., vol. 8, No. 3, Apr. 1990.

Kretz, et al.: "Standardizing Hypermedia Information Objects"; pp. 60–70; IEEE Communications Magazine; May 1992.

Price, Roger: "MHEG: An Introduction to the Future International Standard for Hypermedia Object Interchange"; pp. 121–128; ACM Multimedia, Jun. 1993.

*Primary Examiner*—Joseph R. Burwell
*Attorney, Agent, or Firm*—Jacobson, Price, Holman & Stern, PLLC

[57] ABSTRACT

A method and apparatus for synchronization control of multimedia objects in an MHEG engine are specified. The present system overcomes the shortcomings in the conventional apparatus, which is the fact that interactive processing is not allowed during presentation and that the conventional apparatus cannot control synchronized presentation for failing to provide control of the conditional, temporal, and spatial synchronization. The present apparatus has a user interface for receiving a user input during multimedia presentation whereby interactive processing can be supported, a time token processor for generating a time token event according to the times set by the time token timer, a link processor for transferring a list of action commands associated with the satisfied conditional clauses and a list of the MHEG object information to the action processor with reference to the status table and the link table upon generation of various events, an action processor for generating the action event and for creating a plurality of presentation information units to be presented for each of a plurality of channels to execute the actions received from the link processor, and a plurality of channels for transferring the corresponding frame information to the presentation server according to the times set in the channel timer.

8 Claims, 4 Drawing Sheets

SYNCHRONIZATION CONTROL OF MULTIMEDIA OBJECTS IN AN MHEG ENGINE

BACKGROUND OF THE INVENTION

1. Field of the Invention

The present invention relates generally to multimedia information processing and, more particularly, to a method and apparatus for synchronization control of multimedia objects in an MHEG engine.

2. Description of the Related Art

The term "multimedia" refers generally to the integration of information such as text, audio, video, graphics, and audio/visual data in one digital environment. "Multimedia presentation" refers to the processing of multimedia data as either created in real time or stored in a storage device and to its presentation in a form that can be perceived by a person. To effectively convey the meanings included in multimedia data, the special technique is required which can depict and process information on temporal or spatial relations among media data. This special technique is referred to as "synchronization." There are two kinds of synchronization, i.e., temporal and spatial synchronization which represent temporal and spatial relations among media data, respectively.

The process of temporally and spatially combining each media data is also required to present different types of media data. This combining process is referred to as "media composition." Two kinds of media compositions are known in the art. One is "temporal composition", and the other "spatial composition". The temporal composition is used to define the order of presentation among media data so that media data involved in a presentation sequence can be presented sequentially or parallelly in a synchronized manner. The spatial composition is used to combine media data together in a space provided for presentation as time goes by.

MHEG (Multimedia and Hypermedia Information Coding Expert Group) is an international standard for presentation of multimedia data as will be established in the near future by ISO/IEC (International Organization for Standardization/International Electrotechnical Commission), the international organization for standardization in the field of telecommunications. According to MHEG, "objects" are defined as and used for multimedia data based upon the object oriented paradigm. The MHEG engine is a presentation engine configured such that multimedia data represented in a MHEG format can be interpreted and synchronized to be presented in the same format as intended by the original information producer. The synchronization used in the MHEG engine include temporal, spatial, conditional, system, and script synchronization, among which the conditional synchronization deserves a particular attention. The conditional synchronization achieves synchronization control at the time of presentation in such a manner that the next action behavior is allowed to be executed when the presentation status by the MHEG engine satisfies the conditions as intended by the original scenario producer. The conditional synchronization also allows for an interactive processing between a user and the MHEG engine.

The multimedia synchronization control methods hitherto known in the art include a model using a Calculus of Communicating System (CCS) by Milner, models using Time Glue and Object Hierarchy, an Object Composition Petri Net (OCPN) model based on a Petri Net, Dynamic Timed Petri Net (DTPN) model, an Extended Object Composition Petri Net (XOCPN) model, and Synchronization Relation Tree (SRT) model using a tree structure. However, all of these methods have a shortcoming in that they cannot control a synchronized presentation for failing to provide the effective rendition of the complex temporal relation, spatial relation, audio volume relation, etc. Also, in these methods, the interactive processing is not allowed since compression and enlargement of media data, change of position for presentation, freeze, resume, speed scaling, and inverse and reverse presentations cannot be made dynamically in response to a user input during presentation.

Hence, there has been a long felt need in the art for a method and apparatus for supporting multimedia applications wherein multimedia data is required to be presented through a frequent interaction with the user.

SUMMARY OF THE INVENTION

It is therefore an object of the invention to provide a method and apparatus for synchronization control of multimedia objects which can control the conditional, temporal, and spatial synchronization in an MHEG engine developed to execute the functions defined as the international standards.

It is another object of the invention to provide an improved method and apparatus for synchronization control of multimedia objects which can execute the synchronized presentation by combining media data needed for presentation of multimedia information, and which enable the interactive processing between the user and the MHEG engine by allowing the user input to be processed during presentation.

In accordance with one aspect of the present invention, an apparatus for synchronization control of multimedia objects is provided which converts decoded information into an internal data structure to store it into a class library in an object form. Thereafter, the apparatus analyzes the objects to control synchronization of multimedia data in the MHEG engine having various tables.

In accordance with another aspect of the present invention, a method for synchronization control of multimedia objects is provided which comprises the steps of checking the conditional clauses in a link table to retrieve an action behavior to be subsequently executed and then transferring the retrieved action behavior to an action processor upon occurrence of an event, synchronizing multimedia for each of associated channels by executing the action behavior transferred by said retrieving step, and presenting multimedia information by transferring them to a presentation server in sequence based on synchronization information on frames within the channels inputted by said synchronizing step.

BRIEF DESCRIPTION OF THE DRAWINGS

The aforementioned aspects and other features of the invention are explained in the following description, with reference to the accompanying drawings, wherein.

DETAILED DESCRIPTION OF THE INVENTION

Figure 1:
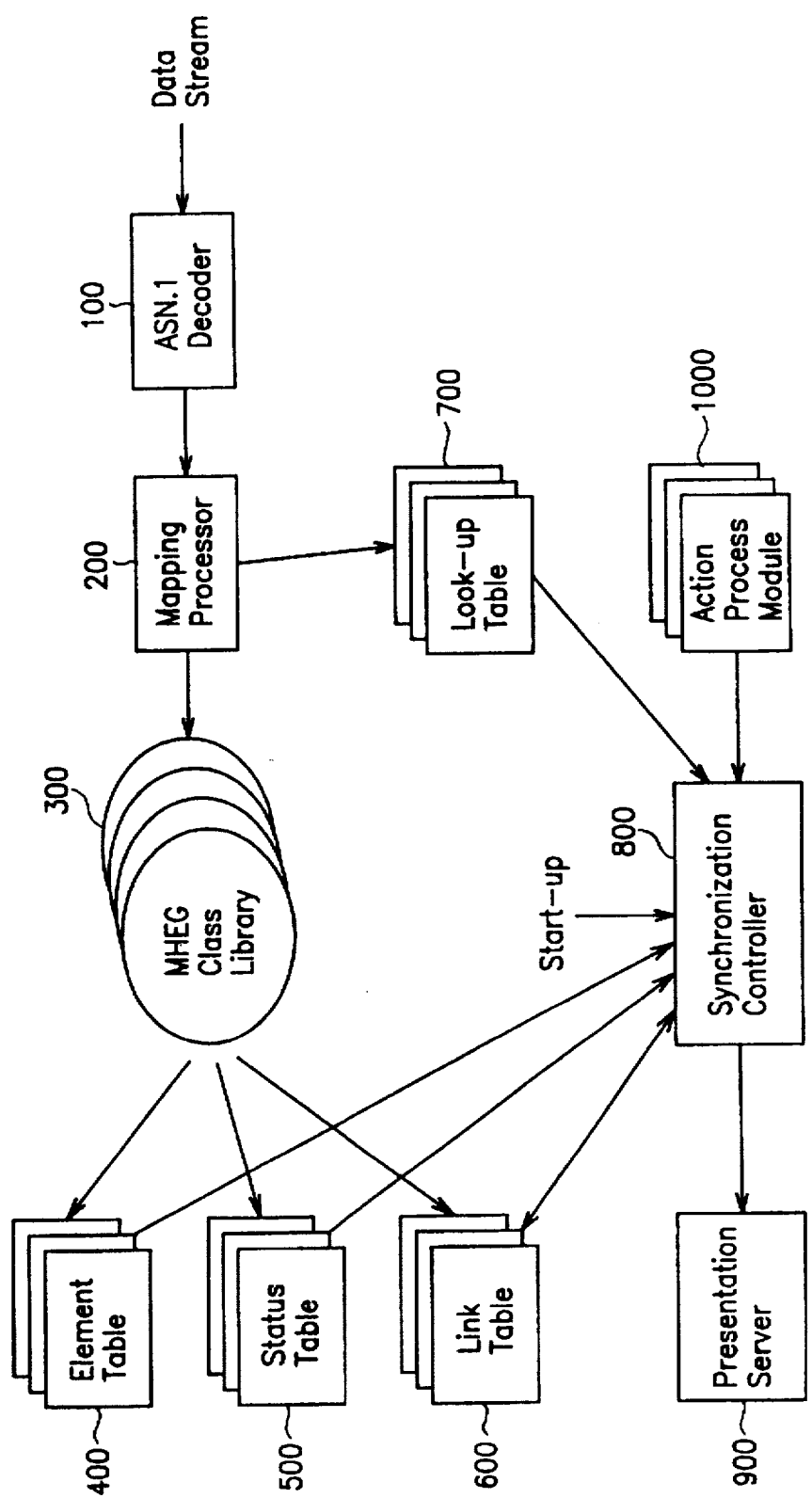
FIG. 1 illustrates a block diagram of the MHEG engine.

Referring now to FIG. 1, there is shown a block diagram of the MHEG engine. As shown in FIG. 1, the MHEG engine generally includes a ASN.1 (Abstract Syntax Notation/One) decoder 100 for reading data stream including encoded MHEG object information from a storage device to convert it into the structure defined in ASN.1, a mapping processor 200 for converting the decoded data into the internal data structure to be used within the MHEG engine to store it in a MHEG class library 300 and for creating a look-up table 700 so that multimedia information used in an action processor can be accessed in real time, a MHEG class library 300 including the MHEG object information converted into the internal data structure, an element table 400 including an address of another MHEG object element which is included in the MHEG object and related to presentation, a status table 500 for representing the process status of the MHEG object to be presented, a link table 600 including conditional clauses and addresses of the MHEG objects associated therewith so that if a particular condition is satisfied, the associated MHEG object can be subsequently presented, a look-up table 700 for linking relative addresses used in the action processor with physical addresses of locations where physical information objects are stored, a synchronization controller 800 for controlling synchronization of the MHEG object information by a list of the MHEG object information with the conditional clauses associated therewith being satisfied and related action commands to be executed, a presentation server 900 for receiving presentation information from the synchronization controller 800 to present multimedia information, and an action process module 1000 for storing program modules to be executed by the action commands.

Figure 2:
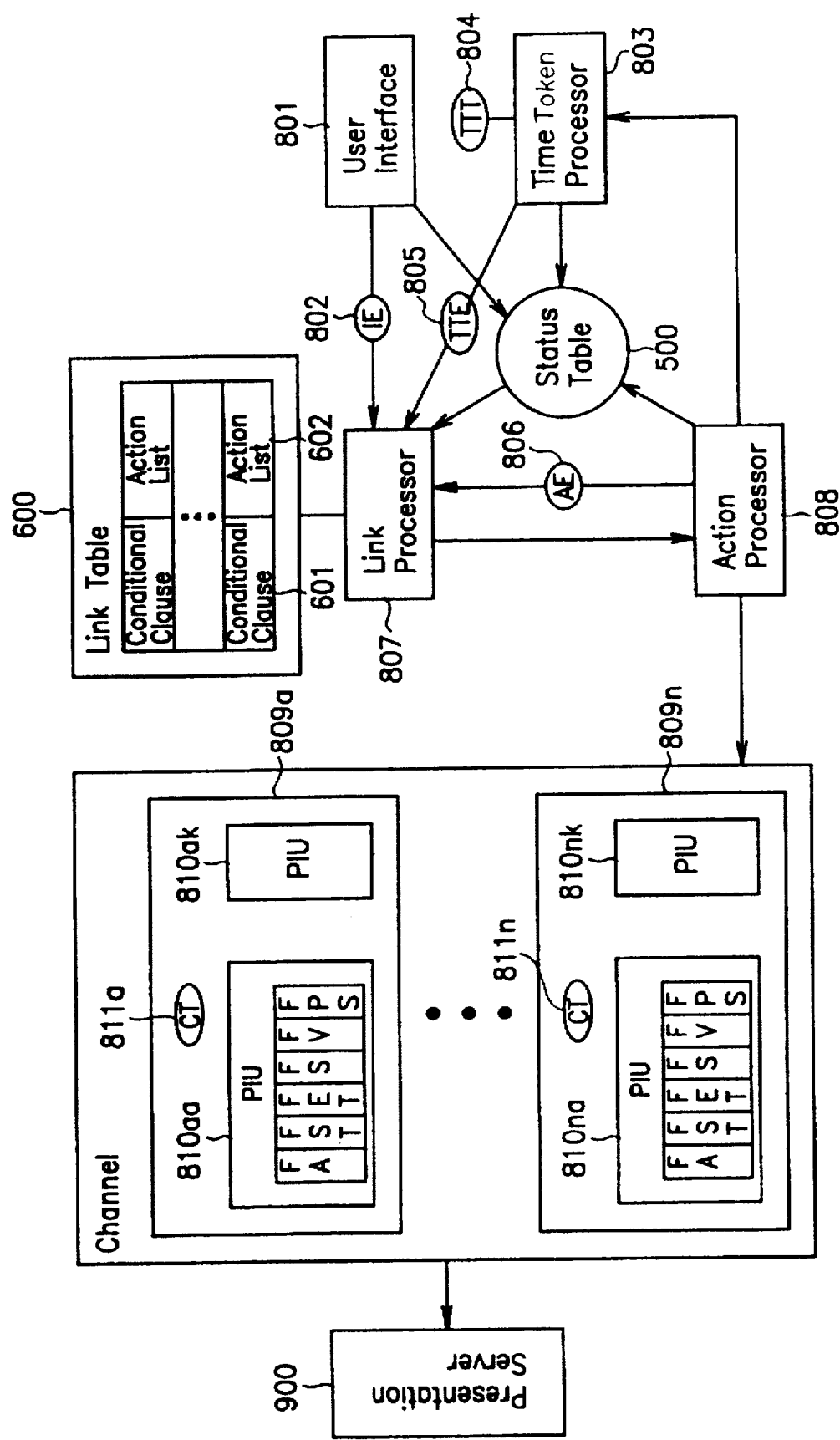
FIG. 2 illustrates a detailed block diagram of the synchronization controller in accordance with the teachings of the present invention.

FIG. 2 illustrates a detailed block diagram of the synchronization controller in accordance with the teachings of the present invention. The controller 800 comprises a user interface 801 for receiving a user input during multimedia presentation to change interaction statuses in the status table 500, thereby allowing for an interactive processing, a time token processor 803 for changing a time token status within the status table 500 at a channel start time previously stored by a time token timer 804 with channel driving times being preset, each channel corresponding to different media information, and for generating a time token event 805, a link processor 807 for checking whether the conditional clauses 601 in the link table 600 are satisfied with reference to values in the status table 500, upon generation of an action event 806, which is generated after execution of an action behavior, the time token event 805, or an interaction event 802, and for transferring a list 602 of action commands associated with the satisfied conditional clauses and a list of the MHEG object data to the action processor 808, the action processor 808 for generating the action event 806 after execution of the action behavior, writing the channel start time in the time token processor 803 to execute actions received from the link processor 807, and creating presentation information units 810aa–810nk for each of a plurality of channels 809a–809n, each channel having multimedia information, and a plurality of channels 809a–809n for transferring the corresponding frame information to the presentation server 900 at the frame start time by the operation of channel timers 811a–811n with times for synchronizing frames in the plurality of channels 809a–809n being preset.

The operation of the controller 800 will now be described in detail. The user interface 801 may receive a user input during multimedia presentation to support an interactive processing. The user interface 801 changes the interaction statuses in the status table 500, and generates the interaction event 802. The time token processor 803 changes the time token statuses within the status table 500 at the channel start time previously stored by the operation of the time token timer 804 for driving the channels, and generates the time token event 805. When the action event 806, which is generated after execution of the action behavior, the time token event 805, or the interaction event 802 is generated, the link processor 807 checks whether the conditional clauses 601 in the link table 600 are satisfied with reference to values in the status table 500. Thereafter, the link processor 807 transfers the list 602 of action commands associated with the satisfied conditional clauses and the list of the MHEG object data to the action processor 808. The action processor 808 writes the channel start time in the time token processor 803 to execute actions received from the link processor 807 or creates the presentation information units 810aa–810nk for each of the plurality of channels 809a–809n for use in presentation of, for example, text, graphics, still image, audio, video, audio/visual data, etc. Data stored in the presentation information units 810aa–810nk includes frame-related information, which is multimedia data to be presented by the presentation server 900, such as Frame Address (FA), Frame Start Time (FST), Frame End Time (FET), Frame Space (FS), Frame Volume (FV), Frame Presentation Speed (FPS), etc. Each of the plurality of channels 809a–809n enables presentation to be executed by transferring the corresponding frame information to the presentation server 900 at the frame start time by the operation of channel timers 811a–811n with the times for synchronizing frames in the plurality of channels 809a–809n being preset.

Figure 3:
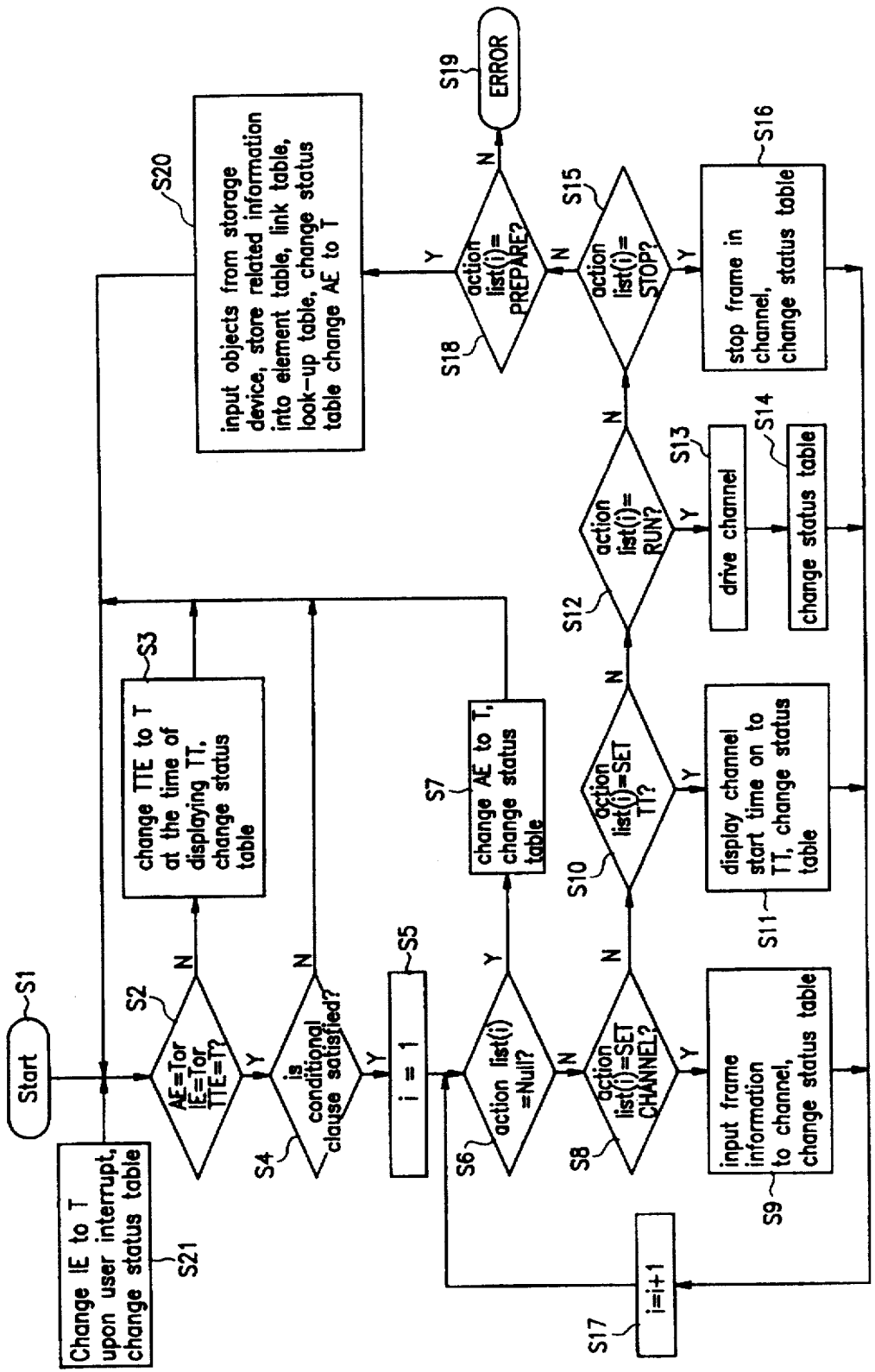
FIG. 3 illustrates a flow chart of a channel synchronization process in the synchronization controller in FIG. 2.

The process executed in the controller 800 will now be described in detail with reference to FIG. 3. When the controller 800 is ready to provide the initial presentation for starting its operation at step S1, it checks whether any of the action event 806, the interaction event 802, and the time token event 805 is generated at step S2. If no event is generated, the controller 800, after waiting until the time token event 805 is generated by the time token processor 803, changes the time token status in the status table 500 and executes step S2 again at step S3. If at least one event is generated, the controller 800 checks whether there is any satisfied conditional clause in the link table 600 at step S4. If there is no satisfied conditional clause at step S4, the controller 800 executes step S2 again, or otherwise, the controller 800 initializes the parameter "i" to 1 at step S5. Next, the controller 800 checks whether the ith action in the action list 602 is null at step S6 to generate the action event 806, change the action status in the status table 500, and execute step S2 again when the result of the check is affirmative at step S7. If the ith action in the action list 602 is not null, the controller 800 checks whether the ith action is the action which sets the frame information in the channels 809a–809n at step S8. If the ith action is the "frame information setting action", the controller 800 sets the synchronization information of the frame related to the corresponding action in the corresponding channel and changes the action status in the status table 500 at step S9. If the ith action in the action list 602 is not the frame information setting action, however, the controller 800 checks whether the ith action is the action which sets the channel start time in the time token (TT) at step S10. If the ith action is the "time token information setting action", the controller 800 sets the corresponding channel start time information in the time token, and changes the action status in the status table 500 at step S11. If the ith action in the action list 602 is not the time token information setting action, the controller 800 checks whether the ith action is the "run action" at step S12. If the ith action is determined to be the run action at step S12, the controller 800 drives the corresponding channel at step S13, and changes the action status in the status table 500 at step S14. If the ith action is not the run action, however, the controller 800 checks whether it is the "stop action" at step S15. If the ith action is determined to be the stop action at step S15, the controller 800 stops the presentation of the corresponding frame in the corresponding channel and changes the action status in the status table 500 at step S16.

After execution of the steps S9, S11, S14, and S16, at step S17, the parameter "i" is incremented by 1 and the process is repeated from step S6. If the ith action in the action list 602 is not the stop action, the controller 800 checks whether it is the "prepare action" at step S18. If the ith action is not the prepare action at step S18, the controller 800 executes the error processing routine and terminates the operation of the MHEG engine at step S19. On the other hand, if the ith action is the prepare action, at step S20, the controller 800 inputs the MHEG object from the storage device into the MHEG engine, stores information obtained by analyzing the objects into the element table 400, link table 600, and look-up table 700, etc., changes the action status in the status table 500, generates the action event 806, and executes step S2. When the user requests the interrupt (user input) for the purpose of changing the presentation, the controller 800 changes the interaction status in the status table 500, generates the interaction event 802, and executes step S2 to enable the user request to be processed at step S21.

Figure 4:
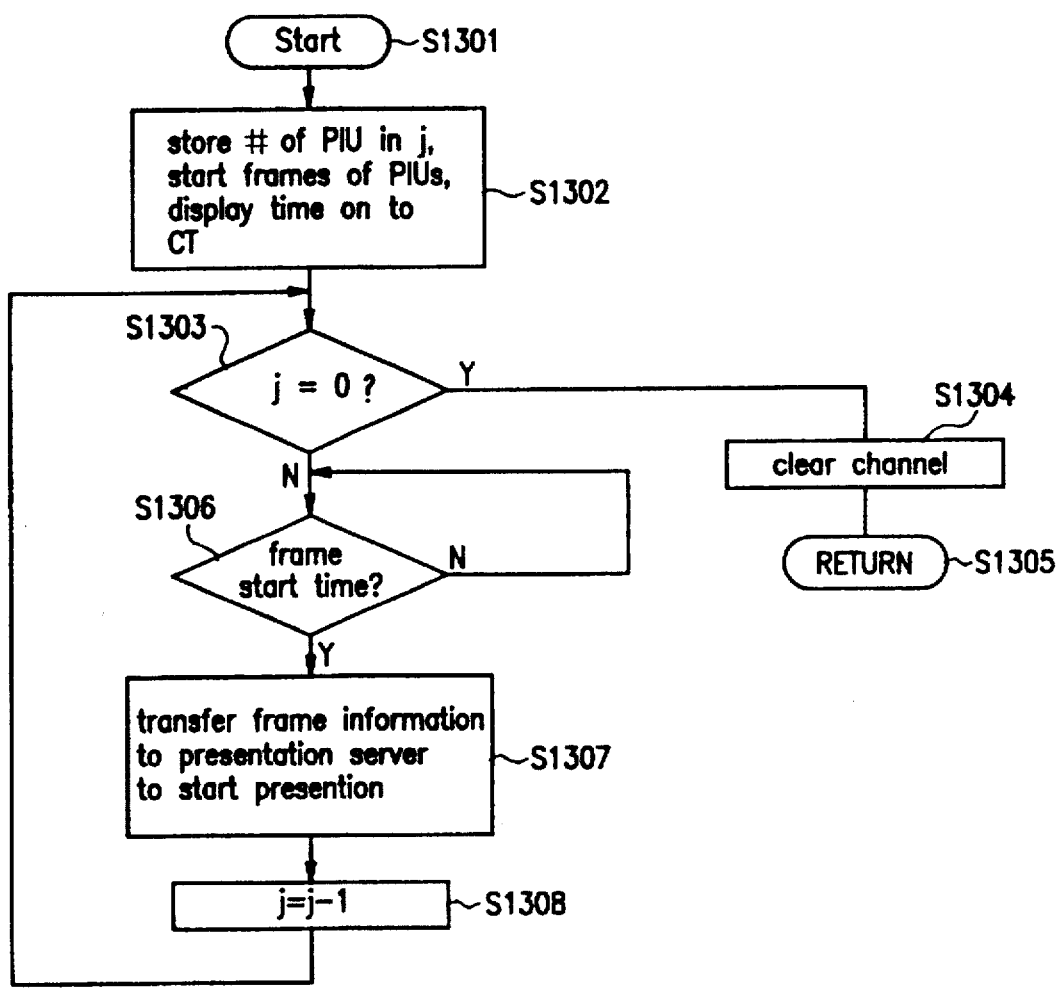
FIG. 4 illustrates a flow chart of a frame synchronization process in channels which are parts of the synchronization controller in FIG. 2.

The process of frame synchronization will now be explained in detail with reference to FIG. 4. If the command is given to drive the corresponding channel at step S13 in FIG. 3, at step S1301, the controller 800 stores the number of presentation information units (PIU) in the channel into the parameter "j", and displays the frame start time (FST) of the presentation information units (PIU) in each channel onto the channel timer (CT) at step S1302. Thereafter, the controller 800 checks whether the parameter j is 0 at step S1303. If the parameter j is 0, the controller 800 clears the channel at step S1304, and completes the driving of the corresponding channel at step S1305. If the parameter j is not 0, the controller 800 checks by the use of the channel timer (CT) 811a–811n whether the parameter j is the frame start time (FST) at step S1306. If the parameter j is not the frame start time (FST) at step S1306, the controller 800, after waiting until the parameter j becomes the frame start time (FST), transfers the corresponding frame information to the presentation server 900 so as to initiate the presentation at step S1307. Thereafter, the parameter j is decremented by 1, i.e., j=j−1, and the process is repeated from step S1303 at step S1308.

As described herein above, the MHEG engine in accordance with the present invention represents mono media information, such as text, still image, graphics, audio, video, audio/visual information, which constitute multimedia presentation, as objects. In accordance with the present invention, the effective rendition of the complex temporal relation, spatial relation, audio volume relation, etc. between objects can be achieved through the use of the synchronization controller in the MHEG engine, thereby facilitating control of the synchronized presentation and enabling the user input to be processed during presentation.

The present invention has been described with reference to a particular embodiment in connection with a particular application. Those having ordinary skill in the art and access to the teachings of the present invention will recognize additional modifications and applications within the scope thereof. It is therefore intended by the appended claims to cover any and all such applications, modifications, and embodiments within the scope of the present invention.

What is claimed is:

1. An MHEG engine for presenting multimedia information in a synchronized manner, comprising:

an ASN.1 decoder for reading data stream including encoded MHEG object information from a storage device to convert it into the structure defined in ASN.1;

a mapping processor for converting the decoded data into the internal data structure to be used within said MHEG engine to store it in an MHEG class library and for creating a look-up table so that multimedia data used in an action processor can be accessed in real time;

an MHEG class library including the MHEG object information converted into the internal data structure;

an element table including an address of another MHEG object element which is included in the MHEG object and related to represented presentation;

a status table for representing the process status of the MHEG object to be presented;

a link table including conditional clauses of the MHEG objects which can be presented and addresses of the MHEG objects associated therewith;

a look-up table for linking relative addresses used in the action processor with physical addresses of locations where physical information objects are stored;

a synchronization controller for checking conditional clauses in the link table and for controlling synchronization of the MHEG object information by a list of the MHEG object information with the conditional clause associated therewith being satisfied and related action commands to be executed;

a presentation server for receiving presentation information from said synchronization controller to present multimedia information; and an action process module for storing program modules to be executed by the action commands, wherein said synchronization controller includes a user interface for receiving a user input during multimedia presentation whereby an interactive processing can be supported and for generating an interaction event;

a time token processor for changing a time stone status within the status table at a channel start time previously stored, and for generating a time token event;

a link processor for checking whether the conditional clauses in the link table are satisfied with reference to values in the status table, upon generation of an action event, which is generated after execution of an action behavior, the time token event, or the interaction event, and for transferring a list of action commands associated with the satisfied conditional clauses and a list of the MHEG object information to the action processor;

an action processor for generating the action event after execution of the action behavior in said link processor, writing the channel start time in said time token processor to execute actions received from said link processor, and creating a plurality of presentation information units to be presented for each of a plurality of channels, each channel having multimedia information; and a plurality of channels for transferring the corresponding frame information to said presentation server at the frame start time.

2. The MHEG engine of claim 1, wherein said time token processor is controlled by a time token timer with channel driving times being preset, each channel corresponding to different media information.

3. The MHEG engine of claim 1, wherein each of said plurality of channels has therein channel timers for transferring the corresponding frame information to said presentation server according to the preset times.

4. The MHEG engine of claim 1, wherein said presentation information units include frame related information which is a multimedia data presented by said presentation server.

5. The MHEG engine of claim 4, wherein said presentation information units include Frame Address (FA), Frame Start Time (FST), Frame End Time (FET), Frame Space (FS), Frame Volume (FV), and Frame Presentation Speed (FPS).

6. A method for synchronization control of multimedia objects in a MHEG engine for presenting multimedia information and which comprises a status table for representing the process status of MHEG objects for presentation of multimedia information, a link table for storing conditional clauses which enable the MHEG objects to be presented and addresses of the MHEG objects associated therewith, a presentation server for receiving presentation information from a synchronization controller to present multimedia information, said method comprising the steps of:

checking the conditional clauses in said link table to retrieve an action behavior to be subsequently executed and transferring the retrieved action behavior to an action processor, upon occurrence of an event, when the synchronization controller starts its operation for presentation of multimedia in the MHEG engine, wherein said step of checking the conditional clauses includes the steps of:

starting the operation of the synchronization controller when the MHEG engine is ready to provide the initial presentation (S1);

checking whether at least one of an action event, an interaction event, and a time token event is generated as the synchronization controller starts its operation (S2);

changing the time token status in the status table and executing said checking step (S2) again after waiting until the time token event is generated by a time token processor, if no event is generated (S3);

checking whether there is any satisfied conditional clause of the conditional clauses in the link table, if at least one event is generated (S4); and executing said checking step (S2) again if there is no satisfied conditional clause, and initializing a parameter "i" to 1 if there is a satisfied conditional clause (S5);

synchronizing multimedia for each of associated channels by executing the action behavior transferred by said checking step; and presenting multimedia information by transferring them to said presentation server in sequence based on synchronization information on frames within the channels inputted by said synchronizing step.

7. The method of claim 6, wherein said synchronizing step includes the steps of:

checking whether the ith action in the action list is null (S6);

generating the action event, changing the action status in the status table, and then executing said checking step (S2) again when the result of the check at step S6 is affirmative (S7);

checking whether the ith action in the action list is the action which sets the frame information in channels, if the ith action is not null (S8);

setting the synchronization information of the frame related to the corresponding action into the corresponding channel, and changing the action status in the status table, if the ith action is the channel information setting action (S9);

checking whether the ith action in the action list is the action which sets the channel start time in the time token (TT), if the ith action is not the channel information setting action (S10);

setting the corresponding channel start time information into the time token, and changing the action status in the status table, if the ith action is the time token information setting action (S11);

checking whether the ith action in the action list is a run action, if the ith action is not the time token information setting action (S12);

driving the corresponding channel, if the ith action is the run action (S13);

changing the action status in the status table (S14);

checking whether the ith action is a stop action, if the ith action is not the run action (S15);

stopping the presentation of the corresponding frame in the corresponding channel and changing the action status in the status table, if the ith action is the stop action (S16);

incrementing the parameter i by 1 and repeating from said step S6, after execution of steps S9, S11, S14, and S16 (S17);

checking whether the ith action in the action list is a prepare action, if the ith action is not the stop action (S18);

executing the error processing routine and terminating the operation of the MHEG engine, if the ith action is not the prepare action (S19);

inputting the MHEG object from the storage device into the MHEG engine, storing information obtained by analyzing the objects into the element table, link table, and look-up table, changing the action status in the status table, generating the action event, and executing said checking step (S2), if the ith action is the prepare action (S20); and changing the interaction status in the status table, generating the interaction event, and executing said checking step (S2) whereby a user command can be processed, when the user inputs the user command for the purpose of changing the presentation status (S21).

8. The method of claim 6, wherein said presenting step includes the steps of:

storing the number of presentation information units (PIU) in the channel into the parameter j, and displaying the frame start time (FST) of the presentation information units (PIU) in each channel onto the channel timer (CT), according to the corresponding channel driving command at said driving step (S13) (S1302);

checking whether the parameter j is 0 (S1303);

clearing the channel, if the parameter j is 0 (S1304);

terminating the driving of the corresponding channel (S1305);

checking by the use of the channel timer (CT) whether the parameter j is the frame start time (FST), if the parameter j is not 0 (S1306);

transferring the corresponding frame information to the presentation server so as to initiate the presentation after waiting until the parameter j becomes the frame start time (FST), if the parameter j is not the frame start time (FST) (S1307); and decrementing the parameter j by 1 and repeating from said step S1303 (S1308).

* * * * *